(12) United States Patent
Park (10) Patent No.: US 9,676,162 B2
(45) Date of Patent: Jun. 13, 2017

(54) DISPLAY DEVICE AND MANUFACTURING METHOD THEREOF

(71) Applicant: SAMSUNG DISPLAY CO., LTD., Yongin, Gyeonggi-Do (KR)

(72) Inventor: Kyoung Woo Park, Daejeon (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/739,097

(22) Filed: Jun. 15, 2015

(65) Prior Publication Data

US 2016/0221293 A1    Aug. 4, 2016

(30) Foreign Application Priority Data

Feb. 4, 2015 (KR) .................. 10-2015-0017164

(51) Int. Cl.
*B32B 3/02* (2006.01)
*B32B 37/14* (2006.01)
*B32B 38/00* (2006.01)

(52) U.S. Cl.
CPC ............. *B32B 3/02* (2013.01); *B32B 37/14* (2013.01); *B32B 38/145* (2013.01); *B32B 2307/404* (2013.01); *B32B 2307/41* (2013.01); *B32B 2307/412* (2013.01); *B32B 2310/0825* (2013.01); *B32B 2310/0831* (2013.01); *B32B 2457/20* (2013.01)

(58) Field of Classification Search
CPC ..................................................... G06F 3/04
See application file for complete search history.

(56) References Cited

U.S. PATENT DOCUMENTS

| | | | |
|---|---|---|---|
| 2007/0213427 A1 | 9/2007 | Lehmann et al. | |
| 2013/0082961 A1* | 4/2013 | Wang | G06F 3/044 345/173 |
| 2014/0120252 A1 | 5/2014 | Savary et al. | |

FOREIGN PATENT DOCUMENTS

| | | |
|---|---|---|
| KR | 10-2013-0123000 A | 11/2013 |
| KR | 10-2014-0019112 A | 2/2014 |
| KR | 10-2014-0037928 A | 3/2014 |

* cited by examiner

*Primary Examiner* — Gerard Higgins
*Assistant Examiner* — Sathavaram I Reddy
(74) *Attorney, Agent, or Firm* — Lee & Morse, P.C.

(57) ABSTRACT

A display device, including a display panel including a display area and a non-display area, the non-display area surrounding the display area; a window facing the display panel and including a light-transmitting area and a light-blocking area, the light-transmitting area corresponding to the display area, and the light-blocking area corresponding to the non-display area; and a plurality of printed layers on the window in the light-blocking area, each printed layer including an isocyanate-blocking group having a different dissociation temperature from isocyanate-blocking groups included in other printed layers.

18 Claims, 7 Drawing Sheets

DISPLAY DEVICE AND MANUFACTURING METHOD THEREOF

CROSS-REFERENCE TO RELATED APPLICATION

Korean Patent Application No. 10-2015-0017164, filed on Feb. 4, 2015, in the Korean Intellectual Property Office, and entitled: "Display Device and Manufacturing Method Thereof," is incorporated by reference herein in its entirety.

BACKGROUND

1. Field

Embodiments relate to a display device and a manufacturing method thereof.

2. Description of the Related Art

In accordance with the progress and maturation of modern information society, there have increasingly been demands for display devices for displaying images, and various flat panel display devices such as a liquid crystal display (LCD) device, a plasma display panel (PDP) display device, or an organic light-emitting diode (OLED) display device maybe used.

SUMMARY

Embodiments may be realized by providing a display device, including a display panel including a display area and a non-display area, the non-display area surrounding the display area; a window facing the display panel and including a light-transmitting area and a light-blocking area, the light-transmitting area corresponding to the display area, and the light-blocking area corresponding to the non-display area; and a plurality of printed layers on the window in the light-blocking area, each printed layer including an isocyanate-blocking group having a different dissociation temperature from isocyanate-blocking groups included in other printed layers.

The plurality of printed layers may include first through n-th printed layers (where n is a natural number greater than 1), which are sequentially deposited, and a dissociation temperature of the isocyanate-blocking group included in a k-th printed layer (where k is a natural number between 1 and n) may be lower than a dissociation temperature of the isocyanate-blocking group included in a (k+1)-th printed layer.

The k-th printed layer may include diethylmalonate (DEM), and the (k+1)-th printed layer may include one or more of 3,5-dimethylpyrazole (DMP), methylethylketoxime (MEKO), or ε-caprolactam (ε-CAP).

The isocyanate-blocking group included in the first printed layer may have a lowest dissociation temperature among all isocyanate-blocking groups included in the plurality of printed layers, and the isocyanate-blocking group included in the n-th printed layer may have a highest dissociation temperature among all isocyanate-blocking groups included in the plurality of printed layers.

The dissociation temperature of the isocyanate-blocking groups may increase from the first printed layer to the n-th printed layer.

The n-th printed layer may be a shielding printed layer and may cover an entirety of the light-blocking area.

The plurality of printed layers may be on a first surface or a second surface of the window.

Each of the plurality of printed layers may have a different color.

The plurality of printed layers may form steps or indentations.

Embodiments may be realized by providing a manufacturing method of a display device, including preparing a display panel including a display area and a non-display area, the non-display area surrounding the display area; printing a first ink layer on a first surface of a transparent substrate and printing a second ink layer on the first ink layer; curing the first ink layer at a first temperature; curing the second ink layer at a second temperature, the second temperature being higher than the first temperature; and coupling the transparent substrate and the display panel such that the first surface of the transparent substrate faces the display panel.

Curing the first ink layer may include applying a first light having a first wavelength to the first ink layer, and curing the second ink layer may include applying a second light having a second wavelength to the second ink layer, the second wavelength being different from the first wavelength.

The first light may be ultraviolet (UV) light and the second light may be infrared (IR) light.

The first light and the second light may be applied from a second surface of the transparent substrate.

Curing the first ink layer may include maintaining a first temperature for a predetermined amount of time, and curing the second ink layer may include maintaining a second temperature for a predetermined amount of time.

The manufacturing method may further include printing a third ink layer on the second ink layer; and curing the third ink layer at a third temperature, the third temperature being higher than the second temperature.

Curing the first ink layer, curing the second ink layer, and curing the third ink layer may include applying light to the first ink layer, applying light to the second ink layer and applying light to the third ink layer, respectively, and the light applied to the first ink layer and the light applied to the second ink layer may have different wavelengths from the light applied to the third ink layer.

Curing the first ink layer, curing the second ink layer, and curing the third ink layer may include maintaining the first temperature for a predetermined amount of time, maintaining the second temperature for a predetermined amount of time, and maintaining the third temperature for a predetermined amount of time, respectively.

The first, second, and third ink layers may have different colors.

The first and second ink layers may form steps or indentations.

The first and second ink layers may have different colors.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Figure 1:
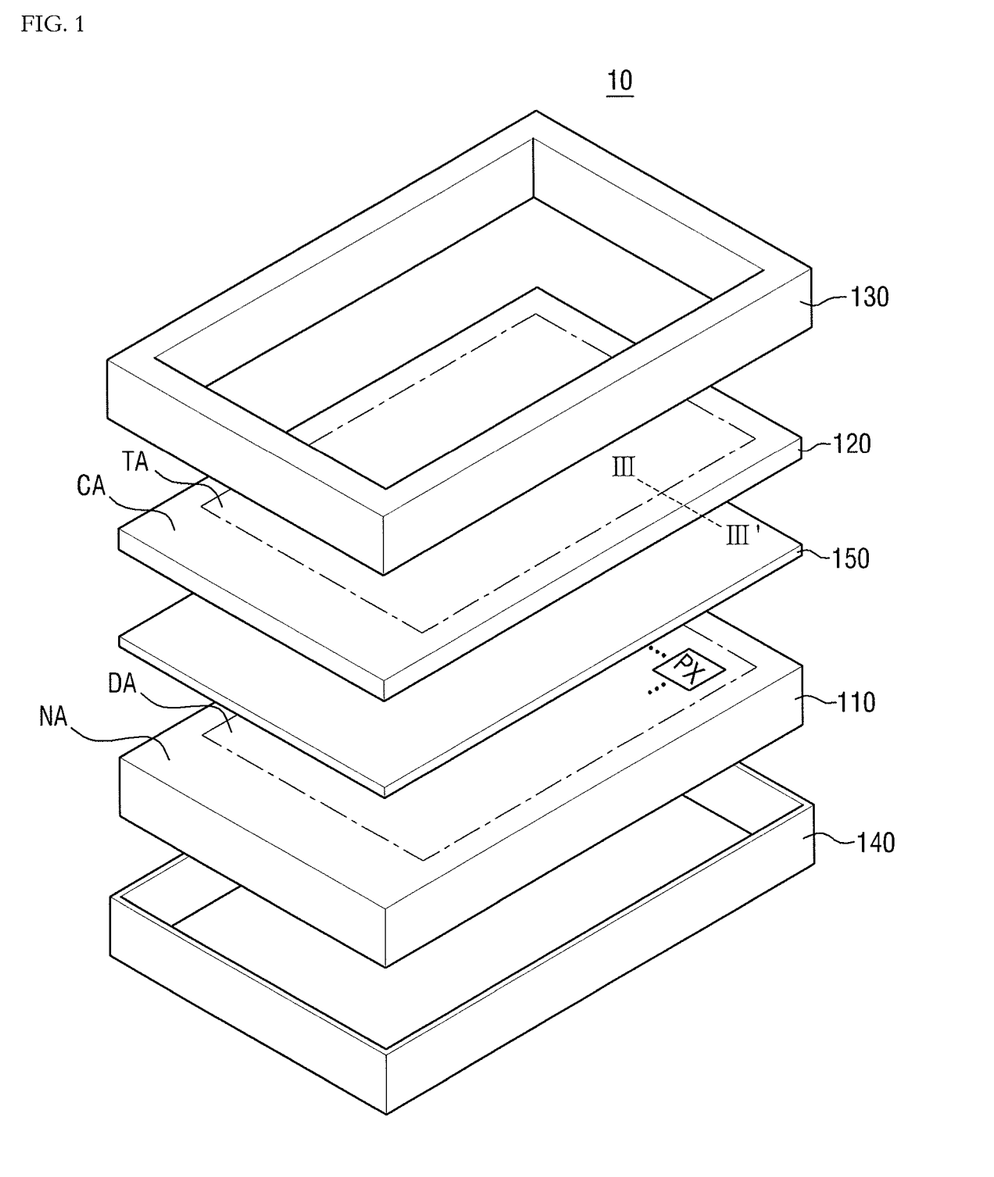
FIG. 1 illustrates an exploded perspective view of a display device according to an exemplary embodiment.

Hereinafter, embodiments will be described with reference to the attached drawings. FIG. 1 illustrates an exploded perspective view of a display device according to an exemplary embodiment.

Referring to FIG. 1, a display device 10 may include a display panel 110 and a window 200, which may face the display panel 110. The display device 10 may also include an upper case 130, a lower case 140 and a coupling layer 150.

The display panel 110, which may be a panel that may display an image, may be a liquid crystal display (LCD) panel, an electrophoretic display panel, an organic light-emitting diode (OLED) panel, a light-emitting diode (LED) panel, an inorganic electroluminescent (EL) display panel, a field emission display (FED) panel, a surface-conduction electro-emitter (SED) display panel, a plasma display panel (PDP), or a cathode ray tube (CRT) display panel. In the description that follows, the display device 10 and the display panel 110 may be, for example, an OLED display device and an OLED panel, respectively. In an embodiment, various display devices and various display panels, other than an OLED display device and an OLED panel, may be used.

The display panel 110 may include a display area DA and a non-display area NA, which may surround the display area DA. In the display area DA of the display panel 110, a plurality of pixels PX may be provided. In the non-display area NA of the display panel 110, circuits for driving the plurality of pixels PX may be provided. Each of the plurality of pixels PX may include an OLED element and at least one transistor, which may drive the OLED element according to a driving signal provided by the circuits. The plurality of pixels PX may display an image according to the driving signal provided by the circuits. The boundary between the display area DA and the non-display area NA may form, for example, a rectangular shape, as illustrated in FIG. 1. In an embodiment, the boundary between the display area DA and the non-display area NA may form, for example, a circular or polygonal shape, according to the shape of the display panel 110.

The window 120 may face a light-emitting direction of the display panel 110, and may be coupled to the display panel 110. The window 120 may cover a surface of the display panel 110 where an image may be displayed. In an exemplary embodiment, the window 120 and the display panel 110 may be coupled to each other by the coupling layer 150. The coupling layer 150 may fill the gap between the display panel 110 and the window 120. For example, the coupling layer 150 may fill the gap between the display panel 110 and the window 120 to couple the display panel 110 and the window 120 together. The coupling layer 150 may have as close a refractive index as possible to the refractive index of the window 120. The closer the refractive index of the coupling layer 150 and the refractive index of the window 120, the less the amount of light that may be reflected, for example, due to the difference between the refractive index of the coupling layer 150 and the refractive index of the window 120. The coupling layer 150 may be formed of a material comprising an acrylic resin that may be curable by ultraviolet (UV) light or heat. The acrylic resin may have a closer refractive index than air to the refractive index of the window 120. The coupling layer 150 may fill the gap between the display panel 110 and the window 120, and may effectively reduce the amount of light reflected, for example, due to a refractive index difference between the coupling layer 150 and the window 120. The coupling layer 150 may have higher elasticity than the window 120. The coupling layer 150 may prevent the display panel 110 from being peeled off from the window 120, and may have relatively excellent elasticity. The coupling layer 150 may effectively protect the display panel 110, and may improve the mechanical stability and reliability of the display device 10. The coupling layer 150 may protect the display panel 110 against external impact. The coupling layer 150 may suppress infiltration of moisture into the display panel 110, and may improve the environmental stability and reliability of the display device 10.

In an exemplary embodiment, the window 120 may be used as a substrate for a touch screen panel (TSP). Electrodes for sensing a touch location upon being touched by an object, for example, a hand or a touch stick, may be disposed on the window 120. The electrodes may be formed of a transparent material. In an exemplary embodiment, the TSP may include an additional transparent substrate and touch electrodes disposed on the transparent substrate. The TSP may be disposed between the display panel 110 and the window 120.

The window 120 may include a light-transmitting area TA and a light-blocking area CA, which may surround the light-transmitting area TA. The light-transmitting area TA may be a transparent area that transmits light therethrough, and an image displayed in the display area DA may be visible to a user through the light-transmitting area TA. The light-transmitting area TA may correspond to the display area DA of the display panel 110, and the light-blocking area CA may correspond to the non-display area NA of the display panel 110. The light-transmitting area TA may correspond to a middle part of the display area DA. The light-blocking area CA may block the transmission of unnecessary light therethrough and may hide, from view, part of the display panel 110 where no image is displayed.

The upper case 130 may be disposed above the window 200 and the display panel 100. The upper case 130 may form the upper exterior edges and the sides of the display device 10. The upper case 130 may include an opening, which exposes the top of the display panel 100 therethrough. The light-transmitting area TA of the window 200 may be exposed through the opening of the upper case 130.

The lower case 140 may form the lower exterior edges of the display device 10. In the lower case 140, all the elements of the display device 10 except for the upper case 130 may be received. The lower case 140 may have a bottom surface and a plurality of sides extended upwardly from the edges of the bottom surface. In an embodiment, the sides of the lower case 140 may be located more inwardly than the sides of the upper case 130. The upper case 130 and the lower case 140 may be formed in various manners using various materials. In an exemplary embodiment, the upper case 130 and the lower case 140 may be formed of a highly rigid material, for example, a metal material, such as stainless steel, cold rolled steel, aluminum, an aluminum alloy, a nickel alloy, magnesium, or a magnesium alloy, or a plastic material. For example, a metal plate formed of a metal material or a plastic resin material formed of the plastic material may be formed into the upper case 130 or the lower case 140 through deep drawing or bending.

Figure 2:
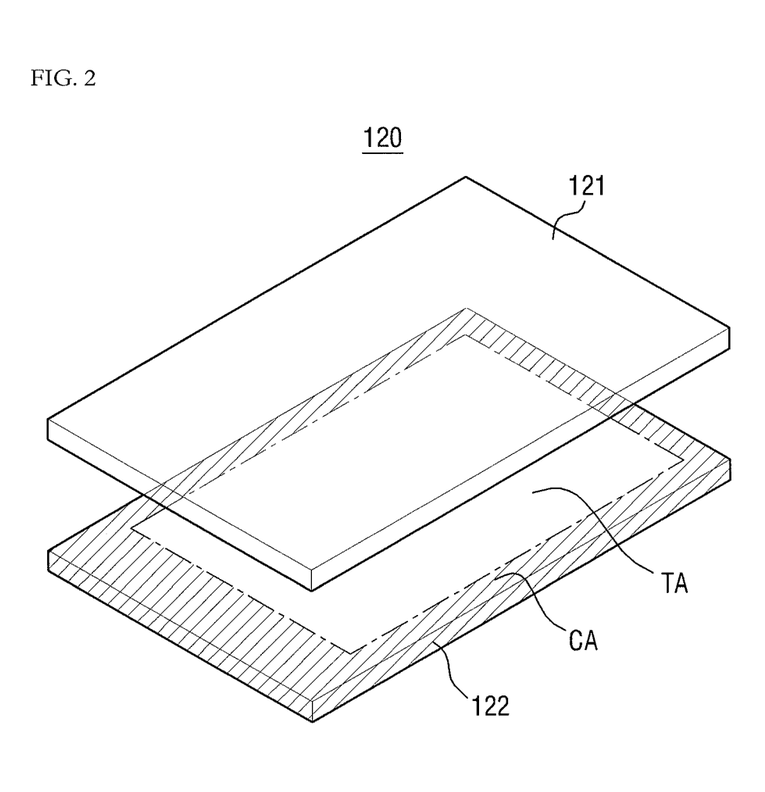
FIG. 2 illustrates an exploded perspective view of a window of the display device according to the exemplary embodiment of FIG. 1.

The structure of the window 120 will hereinafter be described in further detail. FIG. 2 illustrates an exploded perspective view of a window of the display device according to the exemplary embodiment of FIG. 1, FIG. 3 illustrates a bottom view of the window of the display device according to the exemplary embodiment of FIG. 1, and FIG. 4 illustrates a cross-sectional view of the window of the display device according to the exemplary embodiment of FIG. 1, taken along line A-A' of FIG. 3.

Figure 3:
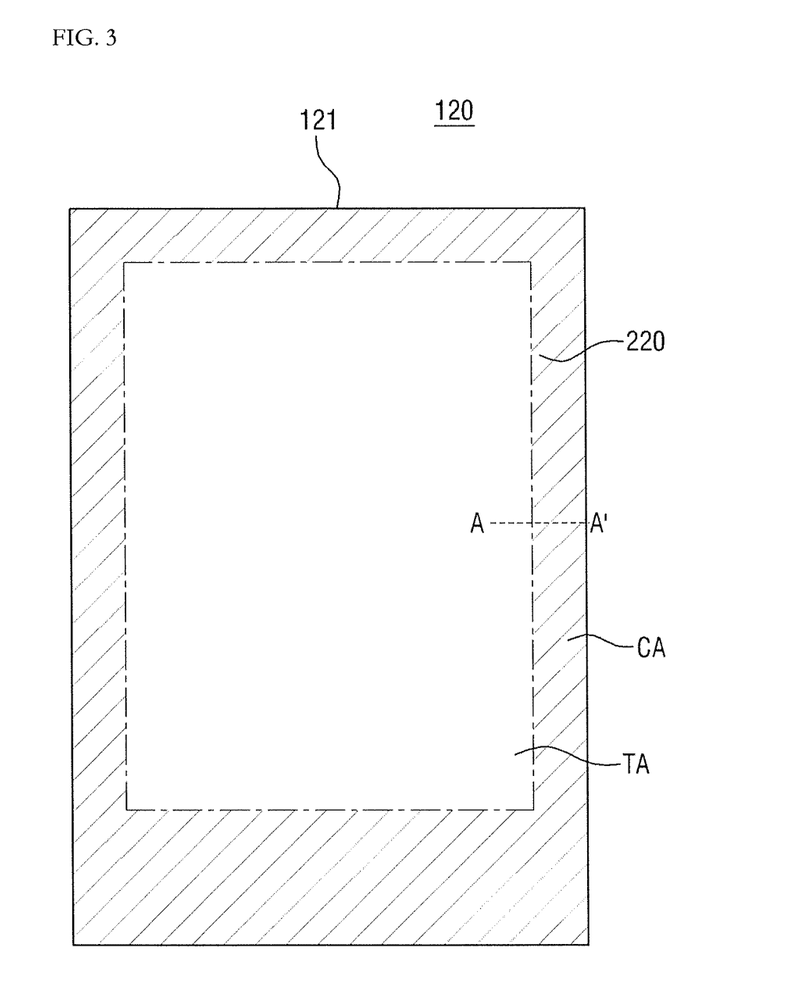
FIG. 3 illustrates a bottom view of the window of the display device according to the exemplary embodiment of FIG. 1.
Figure 4:
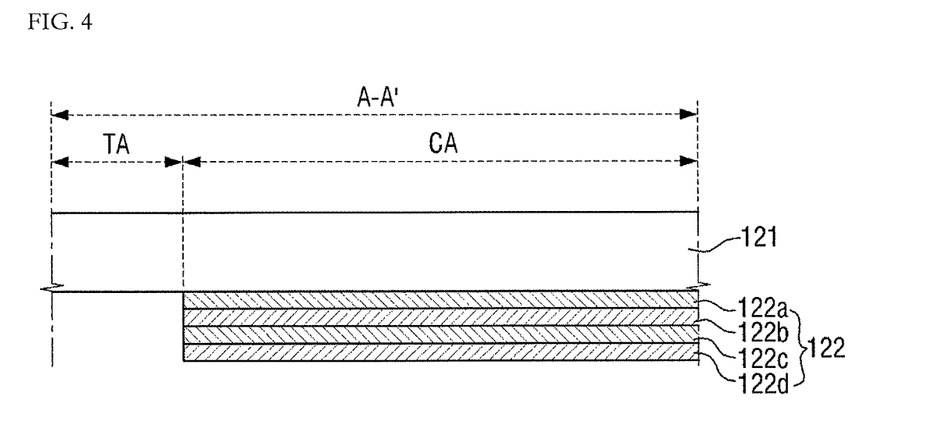
FIG. 4 illustrates a cross-sectional view of the window of the display device according to the exemplary embodiment of FIG. 1, taken along line A-A' of FIG. 3.

Referring to FIGS. 2 to 4, the window 120 may include a transparent substrate 121 and a printed pattern 122, which may be disposed on the transparent substrate 121.

The transparent substrate 121 may be formed of a transparent material. The transparent substrate 121 may be formed of glass, acrylic, polycarbonate (PC), sapphire, quartz, a transparent plastic material, or a combination thereof. The transparent substrate 121 may have, for example, a rectangular shape. In an embodiment, the transparent substrate 121 may be formed into various shapes depending on the shape of the display panel 110.

The transparent substrate 121 may have a first surface, which may face the display panel 110, and a second surface, which may be opposite to the first surface. The first surface of the transparent substrate 121 may be a bottom surface of the window 120 as illustrated in FIG. 3. The printed pattern 122 may be disposed, for example, on the first surface of the transparent substrate 121. In an embodiment, the printed pattern 122 may be disposed on the second surface of the transparent substrate 121. The printed pattern 122 may be disposed in the peripheral area of the transparent substrate 121. The printed pattern 122 may be formed along the edges of the transparent substrate 121. For example, the printed pattern 122 may correspond to the non-display area NA of the display panel 110 that may be opposite to the printed pattern 122. The light-blocking area CA of the window 120 may be an area where the printed pattern 122 may be formed. The window 120 may include the light-blocking area CA, which may include the transparent substrate 121 and the printed pattern 122 formed on the transparent substrate 121, and the light-transmitting area TA, which may include the transparent substrate 121 only. The printed pattern 122, which may be disposed in the light-blocking area CA of the window 120, may prevent light leakage from the display device 10 and may impart a color to the bezel of the display device 10.

The printed pattern 122, which may be deposited on the window 120 in the light-blocking area CA, may be implemented as a stack of printed layers. For example, the printed pattern 122 may include a plurality of first, second, third, and fourth printed layers 122a, 122b, 122c, and 122d. In an embodiment, the printed pattern 122 may be implemented as a stack of four printed layers, i.e., the first, second, third, and fourth printed layers 122a, 122b, 122c, and 122d, as illustrated in FIG. 4.

The first, second, third, and fourth printed layers 122a, 122b, 122c, and 122d may be sequentially deposited. The first printed layer 122a may be disposed directly above the transparent substrate 121, the second printed layer 122b may be disposed on the first printed layer 122a, the third printed layer 122c may be disposed on the second printed layer 122b, and the fourth printed layer 122d may be disposed on the third printed layer 122c. In an embodiment, the first, second, third, and fourth printed layers 122a, 122b, 122c, and 122d may have the same thickness. The first, second, third, and fourth printed layers 122a, 122b, 122c, and 122d may have different colors. The fourth printed layer 122d, which may be most distant from the user, may be a shielding printed layer. The fourth printed layer 122d may be an outermost printed layer that is most distant from the transparent substrate 121. The fourth printed layer 122d may have a black or blackish color. The fourth printed layer 122d may block the transmission of unnecessary light therethrough and may hide, from view, part of the display panel 110 where no image is displayed. The fourth printed layer 122d may cover the entire light-blocking area CA.

The first, second, and third printed layers 122a, 122b, and 122c may be formed in various colors, for example, white, pearl, silver, black, gold and pink colors, to impart a color to the bezel of the display device 10. Some of the first, second, third, and fourth printed layers 122a, 122b, 122c, and 122d may serve the functions of a buffer member for protecting the display panel 110 against external impact.

Each of the first, second, third, and fourth printed layers 122a, 122b, 122c, and 122d may include an isocyanate-blocking group, and the isocyanate-blocking groups of the first, second, third, and fourth printed layers 122a, 22b, 122c, and 122d may have different dissociation temperatures. The first, second, third, and fourth printed layers 122a, 122b, 122c, and 122d may be a plurality of ink layers sequentially printed one over another and cured. To form a stack of four printed layers, (i.e., a stack of the first, second, third, and fourth printed layers 122a, 122b, 122c, and 122d), four ink layers may be needed. Each of the four ink layers may include a composition comprising a plurality of compounds. For example, each of the four ink layers may contain a compound for rendering a predetermined color. Each of the four ink layers may also contain an isocyanate-based compound, which may induce a curing reaction at a predetermined process temperature and/or in response to receipt of light of a predetermined wavelength, and a polyol- based compound, which may react with isocyanate. The isocyanate-based compound and the polyol-based compound may form a urethane-based compound by reacting with each other, as indicated by Formula (1):

where R and R' are each independently hydrogen (H), a $C_1$ to $C_3$ alkyl group, a $C_6$ to $C_{20}$ aryl group, —OH, —OCH$_3$, —COOCH$_3$, —CN, a halogen group, or —NH$_2$.

The urethane-based compound, which may have a predetermined level of rigidity, may cure an entire ink layer, and the cured ink layer may become a printed layer.

The isocyanate-based compound, which may be included in each of the four ink layers, may be blocked by an isocyanate-blocking group contained in the corresponding ink layer with a different dissociation temperature from the isocyanate-blocking groups of the other ink layers. The blocked isocyanate-based compound may not react with the polyol-based compound unless an isocyanate-based blocking group is dissociated therefrom at a predetermined temperature. For example, the blocked isocyanate-based compound may react with the polyol-based compound to form a urethane-based compound only after an isocyanate-blocking group is dissociated therefrom at a predetermined temperature, as indicated by Formula (2):

where B denotes an isocyanate-blocking group.

The isocyanate-blocking group dissociated from the blocked isocyanate-based compound may remain in each of the first, second, third, and fourth printed layers 122a, 122b, 122c, and 122d. The first, second, third, and fourth printed layers 122a, 122b, 122c, and 122d may include isocyanate-blocking groups, respectively, which may have different dissociation temperatures from one another. Each of the isocyanate-blocking groups included in the first, second, third, and fourth printed layers 122a, 122b, 122c, and 122d may be a compound dissociated at a predetermined temperature before the reaction of an isocyanate-based compound and a polyol-based compound. For example, the isocyanate-blocking group included in the first printed layer 122a may have a lower dissociation temperature than the isocyanate-blocking group included in the second printed layer 122b, the isocyanate-blocking group included in the second printed layer 122b may have a lower dissociation temperature than the isocyanate-blocking group included in the third printed layer 122c, and the isocyanate-blocking group included in the third printed layer 122c may have a lower dissociation temperature than the isocyanate-blocking group included in the fourth printed layer 122d. The dissociation temperature of each of the isocyanate-blocking groups included in the first, second, third, and fourth printed layers 122a, 122b, 122c, and 122d may increase, closer to the fourth printed layer 122d. The first printed layer 122a may include an isocyanate-blocking group with a lowest dissociation temperature, and the fourth printed layer 122d may include an isocyanate-blocking group with a highest dissociation temperature. In an exemplary embodiment, the first, second, third, and fourth printed layers 122a, 122b, 122c, and 122d may include diethylmalonate (DEM), 3,5-dimethylpyrazole (DMP), methylethylketoxime (MEKO), and ϵ-caprolactam (ϵ-CAP), respectively. In an exemplary embodiment, the first, second, third, and fourth printed layers 122a, 122b, 122c, and 122d may include DEM, the second printed layer 122b may include one or more of DMP, MEKO, or ϵ-CAP, the third printed layer 122c may include one or more of MEKO or ϵ-CAP, and the fourth printed layer 122d may include ϵ-CAP.

The first, second, third, and fourth printed layers 122a, 122b, 122c, and 122d may be formed at different process temperatures. The first, second, third, and fourth printed layers 122a, 122b, 122c, and 122d may be formed by gradually increasing the process temperature. The ink layer with an isocyanate-based compound blocked by the isocyanate-blocking group with the lowest dissociation temperature may be cured first, and may be formed as the first printed layer 122a. The ink layer with an isocyanate-based compound blocked by the isocyanate-blocking group with the second lowest dissociation temperature may be cured, and may be formed as the second printed layer 122b. The four ink layers may be cured in the order in which they were stacked, starting from the ink layer closest to the transparent substrate 121. For example, the outermost ink layer may not be cured first, and the rest of the ink layers, i.e., the ink layers between the transparent substrate 121 and the outermost ink layer, may be sufficiently cured. Gases generated during curing of the ink layers between the transparent substrate 121 and the outermost ink layer may be sufficiently discharged through the outermost ink layer that may yet to be cured. The display device 10 may include the first, second, third, and fourth printed layers 122a, 122b, 122c and 122c, which may be obtained by curing a plurality of ink layers in the stacking order of the plurality of ink layers on the transparent substrate 121. The display device 10 may minimize reliability degradation such as the generation of bubbles and peeled-off printed layers.

A display device according to an exemplary embodiment will hereinafter be described.

Figure 5:
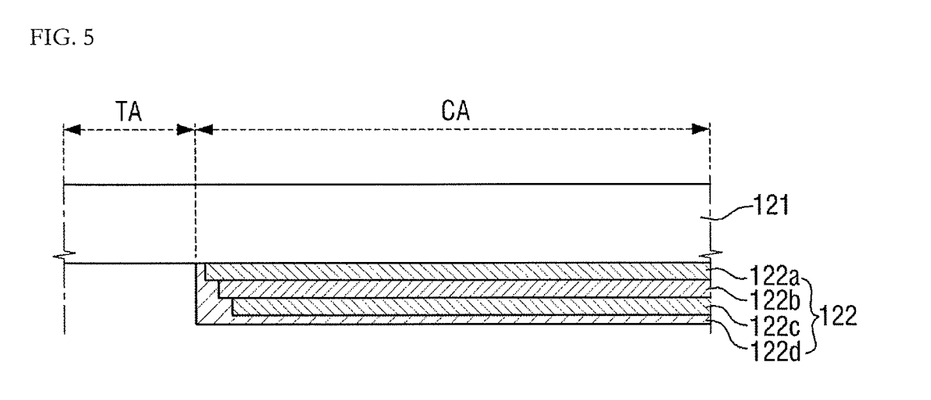
FIG. 5 illustrates a cross-sectional view of a window of a display device according to an exemplary embodiment.

FIG. 5 illustrates a cross-sectional view of a window of a display device according to an exemplary embodiment. Descriptions of elements having the same names and reference numerals as those in the previous exemplary embodiment will be omitted, or at least simplified.

Referring to FIG. 5, a plurality of first, second, third, and fourth printed layers 122a, 122b, 122c, and 122d may form steps or indentations. For example, the first, second, third, and fourth printed layers 122a, 122b, 122c, and 122d may have different widths from one another. The fourth printed layer 122d, which may be an outermost printed layer, may be a shielding printed layer. The fourth printed layer 122d may have a black or blackish color. The fourth printed layer 122d may block the transmission of unnecessary light therethrough and may hide, from view, part of a display panel 110 where no image is displayed. The fourth printed layer 122d may cover an entire light-blocking area CA. The fourth printed layer 122d may be disposed to cover the first, second, and third printed layers 122a, 122b, and 122c. The first, second, and third printed layers 122a, 122b, and 122c may not extend to the boundary between a light-transmitting area TA and the light-blocking area CA. The first, second, and third printed layers 122a, 122b, and 122c may be spaced apart from the boundary between the light-transmitting area TA and the light-blocking area CA. The fourth printed layer 122d may contact a transparent substrate 121, and may extend to the boundary between the light-transmitting area TA and the light-blocking area CA. The fourth printed layer 122d may effectively prevent the first, second, and third printed layers 122a, 122b, and 122c from being visible from outside a display device. The term "outside a (or the) display device", as used herein, may indicate a second surface of the transparent substrate 121, which may be opposite to a first surface of the transparent substrate 121 where the first, second, third, and fourth printed layers 122a, 122b, 122c, and 122d may be deposited. In an embodiment, to make the first, second, and third printed layers 122a, 122b, and 122c invisible, or less visible, from outside the display device, the first, second, and third printed layers 122a, 122b, and 122c may be formed such that their width may become smaller, closer to the top of the stack thereof A manufacturing method of a display device, according to an exemplary embodiment, will hereinafter be described.

Figure 6:
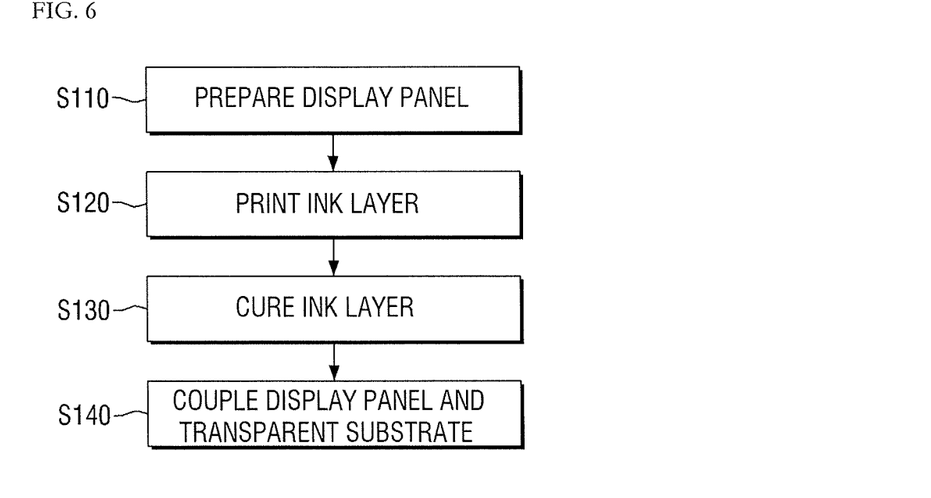
FIG. 6 illustrates a flowchart of a manufacturing method of a display device, according to an exemplary embodiment.
Figure 11:
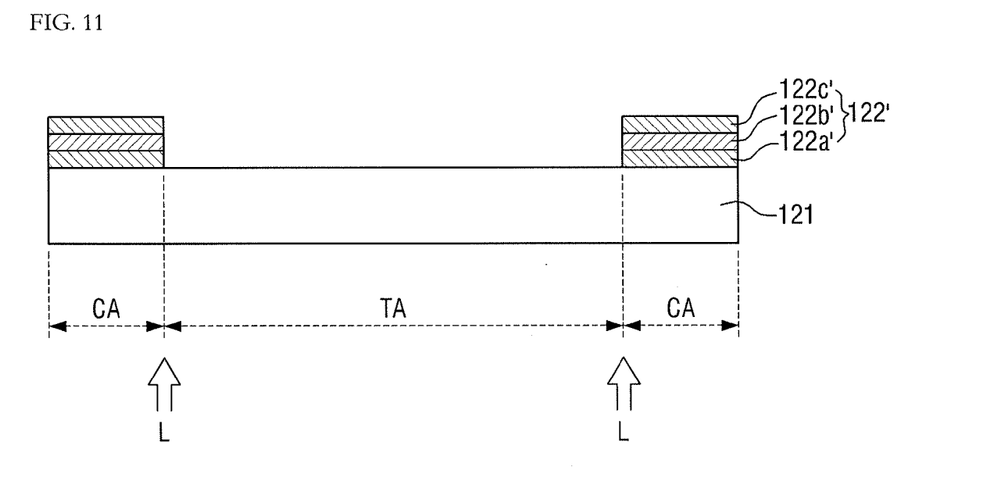
Figure 12:
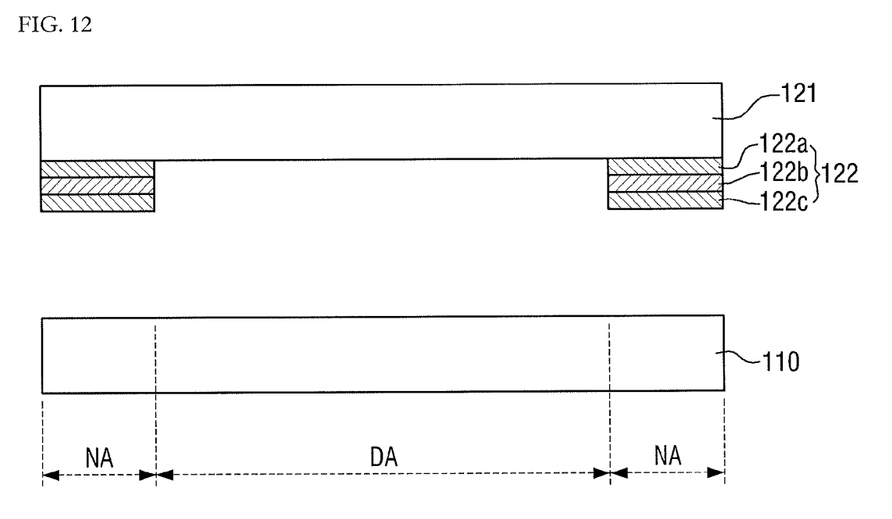
Figure 13:
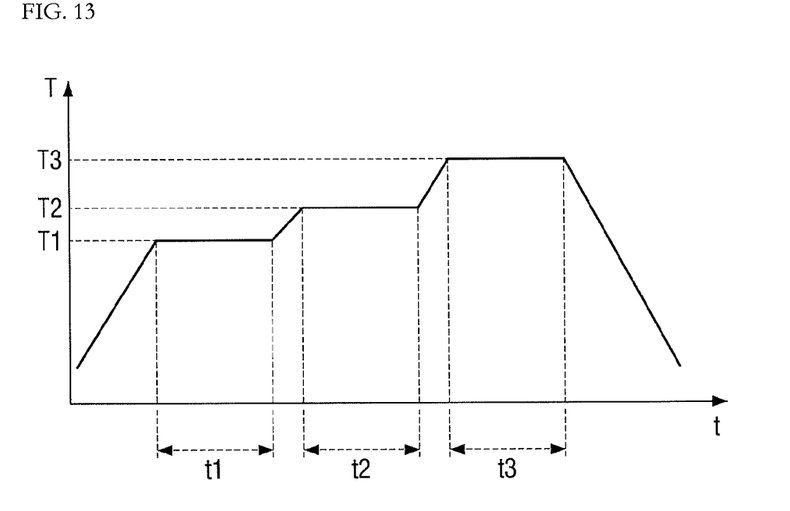
FIG. 13 illustrates a graph of variations in temperature during curing of an ink layer, as performed in the manufacturing method according to the exemplary embodiment of FIG. 6.

FIG. 6 illustrates a flowchart of a manufacturing method of a display device, according to an exemplary embodiment, FIGS. 7 to 12 illustrate cross-sectional views of operations of the manufacturing method according to the exemplary embodiment of FIG. 6, and FIG. 13 illustrates a graph of variations in temperature during curing of an ink layer, as performed in the manufacturing method according to the exemplary embodiment of FIG. 6.

Referring to FIGS. 6 to 13, the manufacturing method according to the current exemplary embodiment may include preparing a display panel (S110), printing a plurality of ink layers on a transparent substrate (S120), curing the ink layers (S130) and coupling the display panel and the transparent substrate together (S140). Descriptions of elements having the same names and reference numerals as those in the previous exemplary embodiments will be omitted, or at least simplified.

First, a display panel 110 is prepared (S110).

Figure 7:
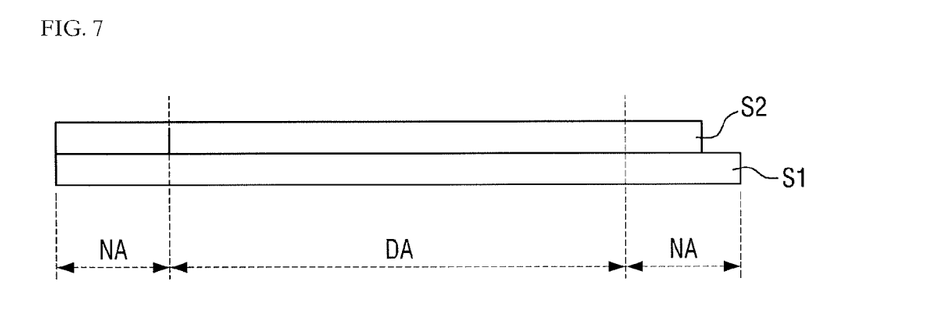
FIGS. 7 to 12 illustrate cross-sectional views of operations of the manufacturing method according to the exemplary embodiment of FIG. 6.

The display panel 110 may include two substrates facing each other, i.e., substrates S1 and S2. The substrate S1 may be an array substrate on which a plurality of pixels and circuits for driving the plurality of pixels may be provided, and the substrate S2 may be an encapsulation substrate which seals the array substrate. The array substrate S1 may be coupled to the encapsulation substrate S2 after formation of the plurality of pixels and the circuits thereon. The display panel 110 may include a display area DA in which the plurality of pixels and the circuits may be provided and a non-display area NA which may surround the display area DA. The array substrate S1 may have an area protruded, e.g. protruding, from, and not encapsulated by, the encapsulation substrate S2, and integrated circuits (ICs) and pads connected to a driving substrate may be disposed in the non-encapsulated area of the array substrate S1.

Thereafter, an ink layer 122' is printed on the transparent substrate 121 (S120).

Figure 8:
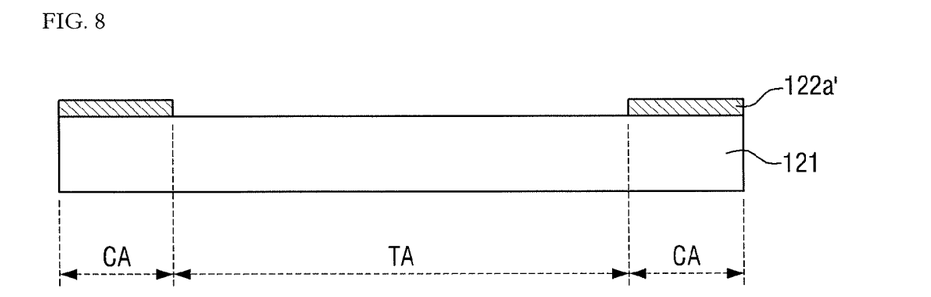
Figure 9:
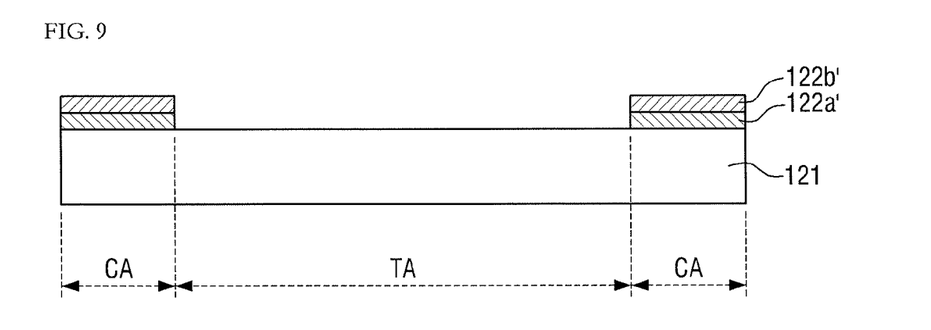
Figure 10:
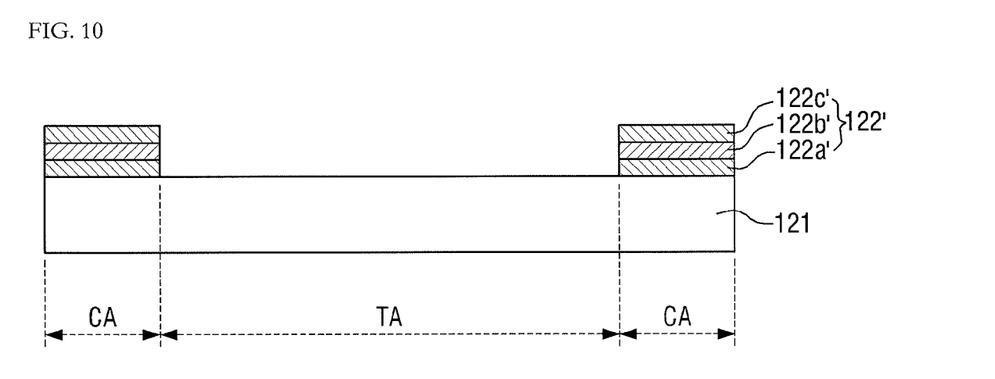

The transparent substrate 121 may be formed of glass, acrylic, sapphire, quartz, PC, a transparent plastic material, or a combination thereof. The transparent substrate 121 may be coupled to the display panel 110 such that a first surface of the transparent substrate 121 may face the display panel 110. The transparent substrate 121 may cover the entire surface of the display panel 110. The transparent substrate 121 may include a light-transmitting area TA and a light-blocking area CA, which may surround the light-transmitting area TA. The light-transmitting area TA may correspond to the display area DA of the display panel 110, and the light-blocking area CA may correspond to the non-display area NA of the display panel 110. The ink layer 122' may be printed on the first surface of the transparent substrate 121 in the light-blocking area CA. In the manufacturing method according to the current exemplary embodiment, the ink layer 122' may have at least a predetermined height to prevent light leakage from a display device and to impart various colors to the bezel of a display device. The ink layer 122' may be implemented as a stack of a plurality of ink layers. The ink layer 122' may be, for example, a stack of three ink layers, i.e., first, second, and third ink layers 122a', 122b' and 122c', as illustrated in FIGS. 8 to 10. In an embodiment, the ink layer 122' may include a stack of more than three, or less than three, ink layers.

The first ink layer 122a' may be formed directly on the transparent substrate 121. In an embodiment, one end of the first ink layer 122a' may adjoin the boundary between the light-transmitting area TA and the light-blocking area CA. In an embodiment, the end of the first ink layer 122a may not adjoin the boundary between the light-transmitting area TA and the light-blocking area CA, but may be a predetermined distance apart from the boundary between the light-transmitting area TA and the light-blocking area CA, depending on the design of the a display device to be manufactured. Thereafter, the second ink layer 122b' may be formed directly on the first ink layer 122a', and the third ink layer 122c' may be formed directly on the second ink layer 122b'. The third ink layer 122c', which may be most distant from the transparent substrate 121, may be a shielding ink layer. The third ink layer 122c' may contain a dye compound with a black or blackish color. When cured, the third ink layer 122c' may block the transmission of unnecessary light therethrough and may hide, from view, part of the display panel 110 where no image is displayed. The third ink layer 122c' may cover the entire light-blocking area CA. Each of the first and second ink layers 122a' and 122b' may contain a dye compound for imparting a color to the bezel of a display device. For example, each of the compositions of the first and second ink layers 122a' and 122b' may include a white-color compound, a pearl-color compound, a silver-color compound, a black-color compound, a gold-color compound, a pink-color compound, or a combination thereof. Each of the first, second, and third ink layers 122a', 122b' and 122c' may be formed using various methods such as screen printing, lamination and photolithography. In the description that follows, the first, second, and third ink layers 122a', 122b' and 122c' may be formed by screen printing.

Formation of the ink layer 122' by screen printing may include placing a screen mask with a predetermined opening over the transparent substrate 122, applying an ink of a predetermined color onto the screen mask using a squeegee, and removing the screen mask. The opening may be formed in the screen mask, conforming to the shape of an ink layer to be formed, and a mesh may be provided in the opening to effectively fill the opening with the ink. The operation of applying the ink to the screen mask rolling the squeegee over the screen mask at a predetermined speed while tilting the squeegee at a predetermined angle, and the opening may be filled with the ink. The operation of removing the screen mask may include lifting up the screen mask in a vertical direction with respect to the transparent substrate 121. By repeatedly performing the aforementioned operations, the ink layer 122', i.e., a stack of the first, second, and third ink layers 122a', 122b' and 122c', may be formed.

In an exemplary embodiment, the first, second, and third ink layers 122a', 122b' and 122c' may form steps or indentations. The third ink layer 122c', which may be the outermost ink layer, may be disposed to cover the first and second ink layers 122a' and 122b'. The third ink layer 122c' may extend to the boundary between the light-transmitting area TA and the light-blocking area CA. When cured, the third ink layer 122c' may prevent first, second, and third printed layers 122a, 122b, and 122c from being visible from outside a display device.

Thereafter, the ink layer 122' is cured (S130).

The ink layer 122' may be cured into a printed layer 122 by predetermined heat and/or light of a predetermined wavelength. Each of the compositions of the first, second, and third ink layers 122a', 122b' and 122c may include a curing reaction initiator, and the curing reaction initiator may initiate a curing reaction in response to receipt of predetermined heat and/or light of a predetermined wavelength. The ink layer 122' may be transformed into the printed layer 122 with a predetermined level of rigidity. In an exemplary embodiment, the ink layer 122' may include an isocyanate-based compound and a polyol-based compound, which may react with isocyanate. The isocyanate-based compound and the polyol-based compound may react with each other at a predetermined process temperature and/or in response to light of a predetermined wavelength being applied thereto, and may form a urethane-based compound.

The ink layer 122' may be transformed into the printed layer 122 by a single curing process, and may be gradually cured in the order in which the first, second, and third ink layers 122a', 122b' and 122c' thereof were stacked on the transparent substrate 121. The curing reaction initiator may be combined with each of a plurality of curing reaction-blocking groups included in the first, second, and third ink layers 122a', 122b' and 122c', respectively, and having different dissociation temperatures. For example, the curing reaction initiator may initiate a curing reaction only after each of the curing reaction-blocking groups is dissociated therefrom at a predetermined temperature. The curing reaction-blocking group included in the first ink layer 122a' may have a lower dissociation temperature than the curing reaction-blocking group included in the second ink layer 122b', and the curing reaction-blocking group included in the second ink layer 122b' may have a lower dissociation temperature than the curing reaction-blocking group included in the third ink layer 122c'. The curing reaction-blocking group included in the first ink layer 122a', which may be closest to the transparent substrate 121, may have a lowest dissociation temperature, and the curing reaction-blocking group included in the third ink layer 122c', which may be most distant from the transparent substrate 122, may have a highest dissociation temperature. In an exemplary embodiment, each of the first, second, and third ink layers 122a', 122b' and 122c' may include a blocked isocyanate-based compound and a polyol-based compound, the first printed layer 122a may include DEM, the second printed layer 122b may include one or more of DMP, MEKO, or ε-CAP, and the third printed layer 122c may include one or more of MEKO or ε-CAP.

Curing of the ink layer 122' (S130) may be performed in a vacuum chamber. Variations in temperature during curing of the ink layer 122' (S130) are as illustrated in FIG. 13. Curing of the ink layer 122' (S130) may include heating a vacuum chamber, maintaining the vacuum chamber at a first temperature T1 for a first period of time t1, maintaining the vacuum chamber at a second temperature T2, which may be higher than the first temperature T1 for a second period of time t2, maintaining the vacuum chamber at a third temperature T3 for a third period of time t3, and dissipating heat from the vacuum chamber. The first, second, and third temperatures T1, T2 and T3 may all be higher than the reaction temperature of the curing reaction initiator included in each of the first, second, and third ink layers 122a', 122b' and 122c'. The first temperature T1 may be a temperature at which the curing reaction-blocking group included in the first ink layer 122a' may be dissociated. During the first period of time t1 when the vacuum chamber may be maintained at the first temperature T1, a curing reaction for the first ink layer 122a' may take place, and the first ink layer 122a' may be transformed first into the first printed layer 122a. The second temperature T2 may be a temperature at which the curing reaction-blocking group included in the second ink layer 122b' may be dissociated. During the second period of time t2 when the vacuum chamber may be maintained at the second temperature T2, a curing reaction for the second ink layer 122b' may take place, and the second ink layer 122b' may be cured into the second printed layer 122b. The third temperature T3 may be a temperature at which the curing reaction-blocking group included in the third ink layer 122c' may be dissociated. During the third period of time t3 when the vacuum chamber may be maintained at the third temperature T3, a curing reaction for the third ink layer 122c' may take place, and the third ink layer 122c' may be cured into the third printed layer 122c. In the manufacturing method according to the current exemplary embodiment, the ink layer 122' may be cured in the order in which the first, second, and third ink layers 122a', 122b' and 122c' thereof were stacked, starting with the first ink layer 122a', which maybe closest to the transparent substrate 121. For example, the third ink layer 122c', which may be at the outermost side of the ink layer 122', may not be cured first, and the first and second ink layers 122a' and 122b' between the transparent substrate 121 and the third ink layer 122c' may be sufficiently cured. Gases generated during curing of the first and second ink layers 122a' and 122b' may be sufficiently discharged through the third ink layer 122c' that may yet to be cured. It may be possible to minimize degradation of the reliability of a display device such as the generation of bubbles in the printed layer 122 and a peeled-off printed layer 122.

Curing of the ink layer 122' (S130) may also include applying light L to the first, second, and third ink layers 122a', 122b' and 122c'. Each of the first, second, and third ink layers 122a', 122b' and 122c' may include a curing reaction initiator, which activates a curing reaction in response to receipt of light of a predetermined wavelength. In an exemplary embodiment, the light L may be applied from a second surface of the transparent substrate 121 to the first, second, and third ink layers 122a', 122b' and 122c'. In this exemplary embodiment, the first ink layer 122a' may receive the light L first, and a curing reaction for the first ink layer 122a' may be activated first.

The wavelength of light applied to the third ink layer 122c, which may be the outermost ink layer, may differ from the wavelength of light applied to the first and second ink layers 122a' and 122b', which may be interposed between the transparent substrate 121 and the third ink layer 122c'. For example, a first light with a first wavelength may be applied first to the first and second ink layers 122a' and 122b' to cure the first and second ink layers 122a' and 122b', and a second light with a second wavelength, which is different from the first wavelength, may be applied to the third ink layer 122c' to cure the third ink layer 122c'. In an exemplary embodiment, the first light may be UV light, and the second light may be infrared (IR) light. The ink layer 122' may only include a stack of the first and second ink layers 122a' and 122b', and the wavelength of light applied to the first ink layer 122a' and the wavelength of light applied to the second ink layer 122b' may differ from each other.

Thereafter, the display panel 110 and the transparent substrate 121 are coupled together (S140).

The transparent substrate 121 may be coupled to the display panel 110 in such a manner that the first surface of the transparent substrate 121 where the printed layer 122 may be formed may face a light-emitting direction of the display panel 110. The transparent substrate 121 and the display panel 110 may be coupled to each other with a coupling layer 150 interposed therebetween.

By way of summation and review, a display device may include a display panel, which may display an image, and a window, which may be disposed over the display panel. The window may include a light-transmitting area, which may correspond to a display area of the display panel where an image may be displayed, and a light-blocking area, which may account for the edges of the display area. The light-blocking area may include a black ink layer, which may block the transmission of unnecessary light therethrough and may hide, from view, part of the display pane where no image may be displayed. The light-blocking area may also include a color ink layer, which may provide aesthetic and design features. A plurality of ink layers, such as the black and color ink layers, may also serve the functions of a buffer for the window in addition to the aforementioned functions.

The plurality of ink layers may be formed by printing layers of ink through screen printing and drying all the printed layers of ink together. During the drying of the printed layers of ink, the outermost layer of ink, which may be most distant from the window, may be dried and cured first because of its relatively large area of contact with the outside of the display device. As the outermost ink layer is cured, gases generated during curing of the rest of the layers of ink may not be able to escape the already-cured outermost layer of ink, and may remain as bubbles. The layers of ink between the outermost layer of ink and the window may not be able to be sufficiently cured, and may be peeled off from the window, and reliability of the display device may be degraded.

Exemplary embodiments provide a display device that may be capable of preventing degradation of reliability by curing a plurality of ink layers in such a manner that ink layers close to a window may be cured first. Exemplary embodiments also provide a manufacturing method of a display device that may be capable of preventing degradation of reliability by curing a plurality of ink layers in such a manner that ink layers close to a window may be cured first. Accordingly, it may be possible to prevent the generation of bubbles and the peeling of the ink layers off from the window. For example, it may be possible to prevent degradation of the reliability of a display device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a display panel including a display area and a non-display area, the non-display area surrounding the display area;
a window facing the display panel and including a light-transmitting area and a light-blocking area, the light-transmitting area corresponding to the display area, and the light-blocking area corresponding to the non-display area; and
a plurality of printed layers on the window in the light-blocking area,
each printed layer including an isocyanate-blocking group having a different dissociation temperature from isocyanate-blocking groups included in other printed layers.

2. The display device as claimed in claim 1, wherein:
the plurality of printed layers includes first through n-th printed layers, where n is a natural number greater than 1, which are sequentially deposited, and
a dissociation temperature of the isocyanate-blocking group included in a k-th printed layer, where k is a natural number of from 1 to less than n, is lower than a dissociation temperature of the isocyanate-blocking group included in a (k+1)-th printed layer.

3. The display device as claimed in claim 2, wherein:
the k-th printed layer includes diethylmalonate (DEM), and
the (k+1)-th printed layer includes one or more of 3,5-dimethylpyrazole (DMP), methylethylketoxime (MEKO), or $\epsilon$-caprolactam ($\epsilon$-CAP).

4. The display device as claimed in claim 2, wherein:
the isocyanate-blocking group included in the first printed layer has the lowest dissociation temperature among all isocyanate-blocking groups included in the plurality of printed layers, and
the isocyanate-blocking group included in the n-th printed layer has the highest dissociation temperature among all isocyanate-blocking groups included in the plurality of printed layers.

5. The display device as claimed in claim 2, wherein the dissociation temperature of the isocyanate-blocking groups increases from the first printed layer to the n-th printed layer.

6. The display device as claimed in claim 2, wherein the n-th printed layer is a shielding printed layer and covers an entirety of the light-blocking area.

7. The display device as claimed in claim 1, wherein the plurality of printed layers is on a first surface or a second surface of the window.

8. The display device as claimed in claim 1, wherein each of the plurality of printed layers has a different color.

9. The display device as claimed in claim 1, wherein the plurality of printed layers forms steps or indentations.

10. A method of forming a display device, the method comprising:
forming a display panel including a display area and a non-display area, the non-display area surrounding the display area;
forming a window facing the display panel and including a light-transmitting area and a light-blocking area, the light-transmitting area corresponding to the display area, and the light-blocking area corresponding to the non-display area; and
printing a plurality of printed layers on the window in the light-blocking area such that each printed layer includes an isocyanate-blocking group having a different dissociation temperature from isocyanate-blocking groups included in other printed layers.

11. The method as claimed in claim 10, wherein:
the printing of the plurality of printed layers includes sequentially depositing first through n-th printed layers, where n is a natural number greater than 1, such that a dissociation temperature of the isocyanate-blocking group included in a k-th printed layer, where k is a natural number of from 1 to less than n, is lower than a dissociation temperature of the isocyanate-blocking group included in a (k+1)-th printed layer.

12. The method as claimed in claim 11, wherein:
the k-th printed layer includes diethylmalonate (DEM), and
the (k+1)-th printed layer includes one or more of 3,5-dimethylpyrazole (DMP), methylethylketoxime (MEKO), or $\epsilon$-caprolactam ($\epsilon$-CAP).

13. The method as claimed in claim 11, wherein:
the isocyanate-blocking group included in the first printed layer has the lowest dissociation temperature among all isocyanate-blocking groups included in the plurality of printed layers, and
the isocyanate-blocking group included in the n-th printed layer has the highest dissociation temperature among all isocyanate-blocking groups included in the plurality of printed layers.

14. The method as claimed in claim 11, wherein the dissociation temperature of the isocyanate-blocking groups increases from the first printed layer to the n-th printed layer.

15. The method as claimed in claim 11, wherein the n-th printed layer is a shielding printed layer and covers an entirety of the light-blocking area.

16. The method as claimed in claim 10, wherein the plurality of printed layers is on a first surface or a second surface of the window.

17. The method as claimed in claim 10, wherein each of the plurality of printed layers has a different color.

18. The method as claimed in claim 10, wherein the plurality of printed layers forms steps or indentations.

* * * * *